United States Patent

Jacyno

[15] 3,694,680
[45] Sept. 26, 1972

[54] STAMPED SHELL SHEET METAL FRAME MODULE FOR A POWER TOOL

[72] Inventor: Anthony Jacyno, Aurora, Ill.

[73] Assignee: G. W. Murphy Industries, Inc. Portable Electric Tools Division, Houston, Tex.

[22] Filed: Oct. 6, 1970

[21] Appl. No.: 78,434

Related U.S. Application Data

[63] Continuation-in-part of Ser. No. 850,834, Aug. 18, 1969, abandoned.

[52] U.S. Cl. .................... 310/50, 310/91, 310/258
[51] Int. Cl. ..................... H02k 5/06, H02k 7/14
[58] Field of Search ............... 310/42, 47, 50, 89–91, 310/254, 258, 259, 40 MM; 220/72, 74

[56] References Cited

UNITED STATES PATENTS

| | | | |
|---|---|---|---|
| 2,316,296 | 4/1943 | Simonds | 220/72 |
| 2,483,269 | 9/1949 | Fender | 220/72 X |
| 2,965,774 | 12/1960 | Rangus | 310/50 |
| 2,982,873 | 5/1961 | Simmons et al. | 310/258 |
| 3,156,838 | 11/1964 | Winther | 310/42 |
| 3,432,703 | 3/1969 | Sheps et al. | 310/50 |

FOREIGN PATENTS OR APPLICATIONS

696,878  8/1940  Germany ..................... 310/42

Primary Examiner—Lewis H. Myers
Assistant Examiner—Stanley J. Witkowski
Attorney—Hofgren, Wegner, Allen, Stellman and McCord

[57] ABSTRACT

A motor and transmission frame module defined by plates that are at least in part similar to one another and are fastened rigidly together in engagement over a substantial area thereof by any of a variety of securing means. Two cut out portions in the plates provide receiving means for a motor assembly and transmission gearing, respectively, with bearing receiving means being provided in the plates by aligned semi-spherical struck out portions that provide radial and axial support for the various bearings and permit alignment of the same upon assembly. Alternatively, struck out portions may be cylindrical to receive stub shafts of bearing blocks or the like. The plates are stiffened by ribs or flanges. The assembled plates mounting a motor and transmission are adapted to be received in a cast housing of a power unit and/or a power tool.

21 Claims, 24 Drawing Figures

PATENTED SEP 26 1972 3,694,680 SHEET 1 OF 5

INVENTOR
Anthony Jacyno
BY Hofgren, Wegner, Allen, Stellman & McCord
ATTORNEYS

STAMPED SHELL SHEET METAL FRAME MODULE FOR A POWER TOOL

CROSS-REFERENCE

This application is a continuation-in-part of my copending application, Ser. No. 850,834, filed Aug. 18, 1969, entitled "Shell Metal Frame Module", now abandoned.

BACKGROUND OF THE INVENTION

This invention relates to the portable hand tool art and in particular to a subframe for holding the motor and transmission parts in the main power tool casing or housing.

Many frames are currently in use for mounting motors and gears in a housing to provide power for portable tools. In most cases the motor and transmission are secured directly in the main tool housing. One device of this character is shown in U.S. Pat. No. 3,411,024. The primary disadvantage of this arrangement is that the motor housing must be cast and it is necessary to disassemble not only the housing but the parts of the motor and the transmission as well in order to repair or replace worn or damaged parts. Moreover in such a construction it is necessary that the bearing bosses in the housing each be machined separately in a different machining operation to be certain the bearings are accurately located. Moreover, the various bosses for supporting the motor must be similarly machined in a separate operation.

Certain other types of motor and transmission frames are in current use and one of these includes cast supporting members for the motor and transmission separate from the main motor housing. Exemplary of such a device is the frame assembly shown in U.S. Pat. No. 2,719,238. A primary disadvantage in this construction is that the die cast parts required are extremely expensive to manufacture with any degree of accuracy. Moreover, as with the above-described construction wherein the motor and transmission are supported directly in the main housing, this secondary cast frame usually requires the separate machining of the various bearing locating elements in the frame as well as the motor supporting bosses.

Still another arrangement for supporting motors within frames is the use of a sheet metal member with various tangs and ears bent in various directions to provide support within a main housing. Such a construction is shown in U.S. Pat. No. 3,357,101. However, this construction not only does not provide a rigid support for the motor assembly but also provides little or no support for the various bearings required in the transmission of power from the motor to the tool associated with the portable tool.

SUMMARY OF THE INVENTION

According to the present invention two substantially planar mating plates are provided stamped from sheet metal and fastened together in substantially contiguous relation. The plates are formed so that during assembly they encapsulate the various bearings provided for both the motor and the various gear shafts in the transmission. The plates are generally rectangular in construction and have two major cut out portions that receive respectively the motor assembly and the reduction gearing. The motor as well as the gears in the transmission have bearings at each end of their associated shafts which are received in spherical recesses defined by semi-spherical struck out portions in each of the plates aligned with one another. It should be noted that all of the struck portions as well as the cut out portions may be formed in a single stamping operation.

The spherical bearing receiving recesses defined by the two contiguous frame members provide both axial and radial support for the various shaft bearings considerably simplifying the accurate location of the bearing supports over that required in prior art constructions.

During assembly the motor and transmission gearing along with their associated bearings are positioned on one of the plates and thereafter the other plate, which is a mate of the first plate, is placed over the motor and transmission elements in a manner to encapsulate the various bearings and to frictionally hold the motor windings. The two plates then are fastened together and a completely assembled power source is provided.

The frame module thus resulting with the motor and transmission assembly supported therein may be readily inserted or removed from any one of a number of hand tools. The peripheries of the frame members, which are in contiguous engagement throughout a substantial portion thereof, fit within suitable recesses in the main housing for supporting the entire module. Damaged modules may be easily replaced when necessary.

One of the primary advantages in the present construction is that the stamped subframe module does not require accurate machining of the main frame into which it fits.

Moreover, the present improved stamped sheet metal parts are inexpensive to manufacture and assemble providing an inexpensive power source usable in a variety of tools thereby reducing the manufacturing costs of the tools as well as improving the ease of repairing the tool. The stamped subframe module can be produced in a nearly fully automated setup which saves considerable cost in manufacturing by eliminating or reducing labor costs.

According to one embodiment of the invention, the two plates are formed as mirror images of one another while according to a modified embodiment of the invention, the same are substantial mirror images of one another differing principally in the presence of struck out portions in one of the plates adapted to receive brush holders, or in the presence of various formations used in securing the plates together.

Also, in one embodiment of the invention, the plates may be stiffened by means of stiffening ribs while in another embodiment, the sides of the plates are turned at 90° to the plate to provide outwardly extending stiffening flanges which provide greater strength than ribs. The flanges advantageously may be employed to locate the module within a housing.

The invention also comprehends a number of means by which the two plates may be secured together. According to one embodiment, screws or rivets are employed while others utilize C-shaped clips, complementary eyes received in notches including rods extending through the eyes, or U-shaped formations on the sides of one plate for tightly receiving the sides of the other plate.

Furthermore, the bearing receiving means need not be spherical according to the invention. In another embodiment, they are formed as complementary semi-cylindrical recesses which receive stub shafts on bearing blocks.

Other objects and advantages of the invention will become apparent from the following specification taken in conjunction with the accompanying drawings.

DESCRIPTION OF THE PREFERRED EMBODIMENTS

Figure 1:
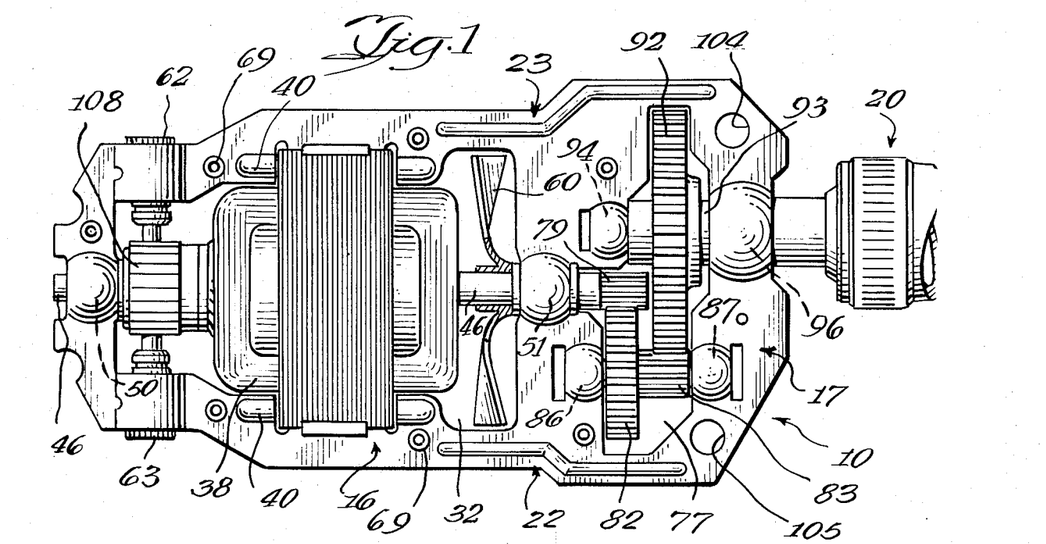
FIG. 1 is a plan view of the present frame assembly with the motor and transmission parts shown in their assembled positions.
Figure 2:
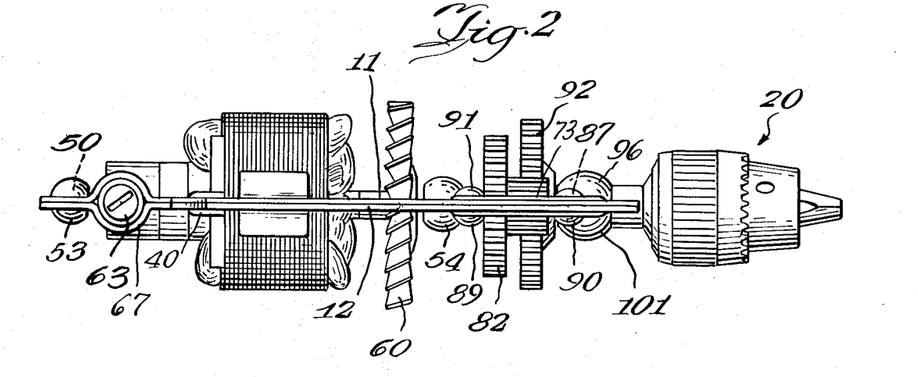
FIG. 2 is a side view of the frame assembly shown in FIG. 1.
Figure 7:
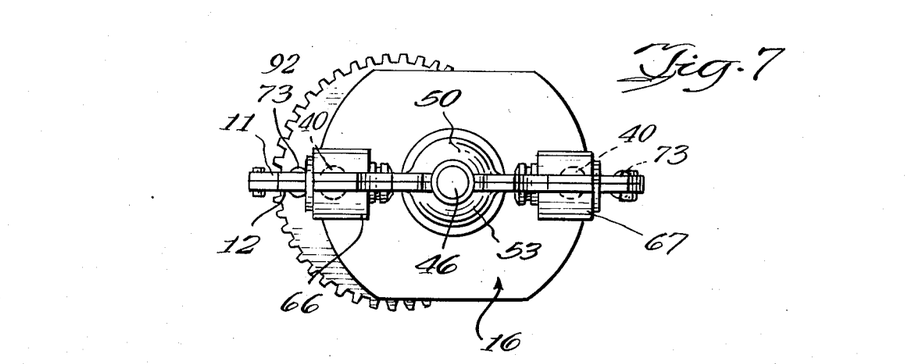
FIG. 7 is a left end view of the assembly shown in FIGS. 1 and 2.
Figure 8:
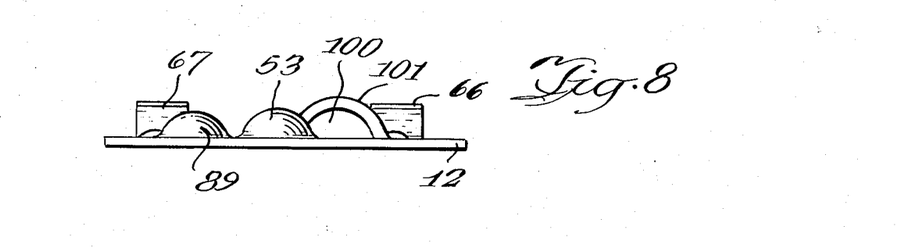
FIG. 8 is a left end view of the lower frame rotated 180° from its position shown in FIG. 2.

Referring to the drawings and particularly the assembly view shown in FIGS. 1, 2 and 7, the present sub-frame module 10 is seen to include an upper frame plate 11 and a lower frame plate 12. In the exemplary embodiment, both of the plates 11 and 12 are of generally planar configuration and stamped in a single operation from blank sheet metal. However, the plates could be formed of sheet plastic by vacuum forming or heat forming operations. Generally, it is desirable to use sheet metal in that the metal acts as a heat sink for the cooling of various moving parts. The plates 11 and 12 may be mirror images of one another so that when placed in contiguous relation and fastened together the various recesses and openings in the plates will be aligned with one another to provide support for a motor assembly 16 and a transmission assembly 17. The respective plates 11 and 12 may be similar or may be mirror images just as long as the portions necessary for locating certain critical elements are properly aligned. The motor assembly 16 and the transmission assembly 17 drive a suitable tool such as a drill chuck 20 shown in FIGS. 1 and 2.

The edges or the side portions 22 and 23 of the frame module 10 are constructed to fit within suitable recesses or bosses in a main portable tool housing either adjacent the parting line of the housing or, if desired, transverse to the parting line.

Since the upper and lower frame plates 11 and 12 of the illustrated embodiment are mirror images of one another only the lower plate 12 will be described in detail particularly with respect to FIGS. 3, 4, 5, 6 and 8 but it should be understood that the upper plate 11 has the same configuration but simply mirror imaged. It is also to be understood that plates 11 and 12 may be similar in parts and dissimilar in other parts just as long as they assemble together to hold the motor and transmission in proper running relationship.

Figure 3:
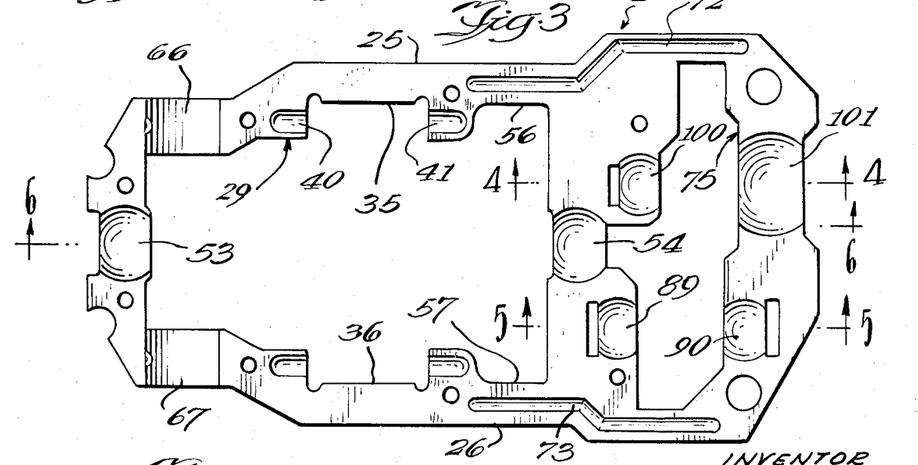
FIG. 3 is a sub-assembly view of the lower frame plate.
Figure 4:
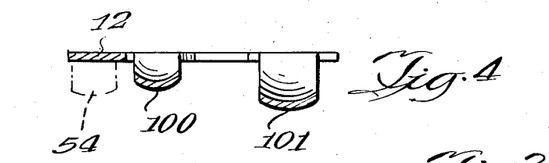
FIG. 4 is a cross section taken generally along line 4—4 of FIG. 3 illustrating the semi-spherical bearing receiving recesses for one of the transmission gears.
Figure 5:
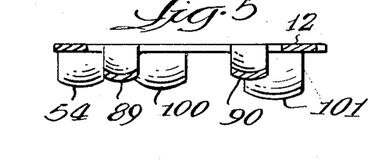
FIG. 5 is a cross section taken generally along line 5—5 of FIG. 3 illustrating the bearing receiving recesses for another of the transmission gears.
Figure 6:
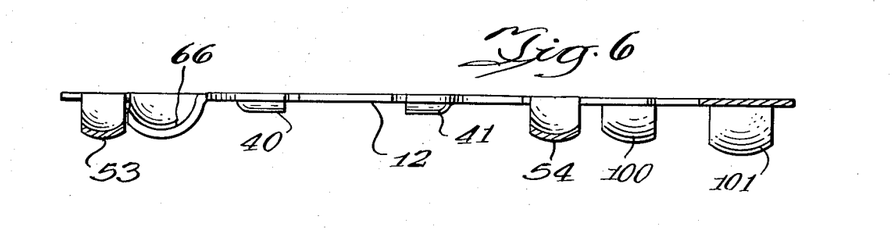
FIG. 6 is a cross section taken generally along line 6—6 of FIG. 3 illustrating the bearing receiving recesses for the motor.

Lower plate 12 is seen to be planar in configuration to provide a rigid unit when affixed to the upper plate, rectangularly elongated to permit the aligned arrangement of the motor assembly 16 and the transmission assembly 17, with parallel side edges 25 and 26 to facilitate the insertion of the frame assembly 10 into a main housing (not shown).

A first generally rectangular cut out portion 29 is provided in the plate 12 and defines with the upper plate a recess 32 (FIG. 1) for receiving the motor assembly 16. The cut out portion 29 covers a major area of the plate 12 with transverse recesses 35 and 36 for the purpose of frictionally receiving and supporting the windings of a motor 38 which is of a conventional type employed in portable tools. Defined adjacent the recesses 35 and 36 are longitudinally extending dead ended recesses 40 and 41 struck from the plane of the plate 12 for the purpose of defining apertures with the upper plate 12 that may be employed to rigidify the assembly and assist in supporting the motor 38.

The motor 38 has a through shaft 46 projecting from both ends thereof carrying spherical bearings 50 and 51. For the purpose of both axially and radially supporting these bearings 50 and 51 semi-spherical struck out portions 53 and 54 are provided in plate 12 which when placed over the bearings 50 and 51, along with the corresponding recesses in the upper plate 11, encapsulate and support the bearings in all directions, thus assisting in supporting the motor assembly 16.

The cut out portion 29 also has recessed 56 and 57 at the forward end thereof for the purpose of receiving a cooling fan 60 rotatably fixed to the motor shaft 46.

The motor assembly 16 includes a pair of transversely disposed brush holders 62 and 63. The brush holders 62 and 63 have cylindrical outer surfaces and to accommodate these surfaces and rigidly support the holders semi-cylindrical transverse recesses 66 and 67 are provided in the lower frame 12 adjacent the rear end of cut out portion 29. Recesses 66 and 67 along with the corresponding recesses in plate 11 firmly encapsulate the brush holders 63 and 62 when the plates 11 and 12 are fastened together with suitable fasteners such as rivets 69 shown in FIG. 1. It should be understood that other fasteners such as sheet metal screws may be employed as well.

Recesses defining ribs 72 and 73 are provided adjacent the periphery of the plate 12 for the purpose of rigidifying the assembly 10.

For the purpose of receiving the transmission assembly 17, a smaller cut out portion 75 is provided at the forward end of plate 12 which with the corresponding recess in plate 11 defines a transmission or reduction gearing recess 77 in assembly 10 as shown in FIG. 1.

The recess 75 is generally rectangular in configuration with its longitudinal axis transverse to the longitudinal axis of the overall frame assembly 10. The end of shaft 46 carries a small gear 79 as shown in FIG. 1 which interengages an enlarged pinion gear 82. Pinion 82 is supported on a shaft (not shown) and rotatably fixed thereto along with a smaller reduction gear 83. The shaft supporting gears 82 and 83 have semi-spherical bearings 86 and 87 at the ends thereof. Bearings 86 and 87 are supported within semi-spherical recesses 89 and 90 formed in plate 12 adjacent the cut out portion 75. As with the motor bearing recesses 53 and 54, the recesses 89 and 90 along with the corresponding recesses or struck out portions 91 and 92 (see FIG. 2) encapsulate and support the bearings 86 and 87 in both radial and axial directions.

The small gear 83 drivingly engages an enlarged gear 92 within recess 77 that is rotatably fixed to a shaft 93 which carries the chuck 20. Shaft 93 has a small spherical bearing 94 at the left end thereof as seen in FIG. 1 and an enlarged spherical bearing 96 at the right end thereof. For the purpose of supporting the bearings 94 and 96 in a similar manner to the other bearings described above struck out semi-spherical recesses 100 and 101 are provided in plate 12. Recesses 100 and 101 in conjunction with the aligned recesses in plate 11 support the bearings 94 and 96.

Suitable apertures such as shown at 104 and 105 may be provided for assisting in supporting the frame assembly 10 within the associated main housing.

During assembly the motor assembly 16 along with its associated bearings, and the gearing assembly 17 along with its associated bearings are positioned in their proper location on the lower frame member 12. Thereafter the upper frame member 11 is positioned over the various bearing elements as well as the brush supports 62 and 63 encapsulating these parts and rigidly supporting the motor assembly and the transmission assembly 17 in the subframe 10. Thereafter the rivets 69 are passed through the plates fastening the plates together so that the planar walls thereof engage one another in contiguous fashion providing a rigid frame assembly. Thereafter the brushes are inserted in their associated holders 62 and 63 and placed in contact with commutator 108 thus providing a source of current for the motor 38.

The upper and lower frame members 11 and 12 may be different in certain areas. That is, the brushes 62, 63 may be mounted differently from that illustrated so that the lower frame 12 will be different from the upper frame 11 in that area. Likewise, other portions of the frames 11 and 12 may differ without departing from the invention. The principal area where the frames should be alike is in the bearing support areas. In the situation where the top and bottom frames are different, two stampings would be necessary instead of one but all of the other advantages of the invention will be realized.

Figure 9:
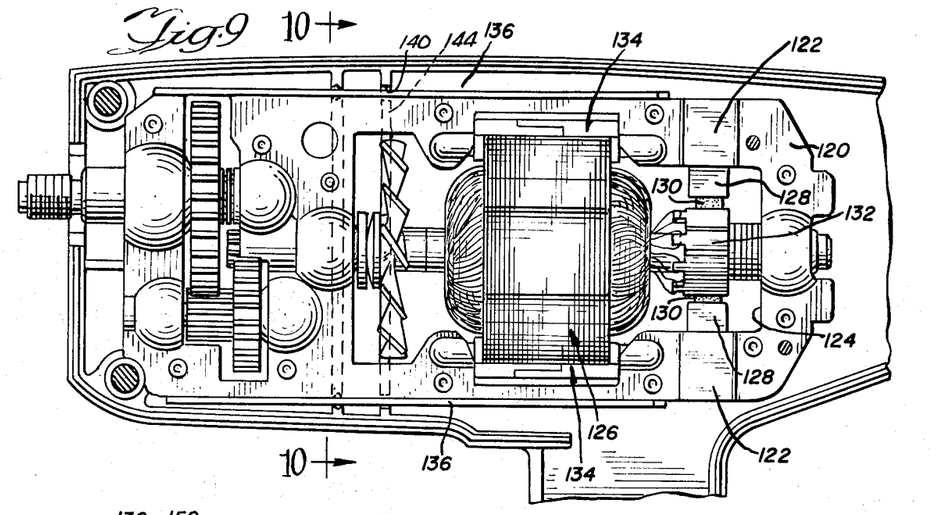
FIG. 9 is a side elevation of a frame assembly made according to another embodiment of the invention with parts shown in section.

An example of a modified structure as mentioned in the preceding paragraph is seen in FIG. 9. In particular, a frame member 120, which is otherwise a mirror image of an opposing frame member 12 (FIG. 10), includes a pair of rectangular struck out portions 122 facing the central cut out 124 in which a motor, generally designated 126, is received. The rectangular struck out portions 122 in conjunction with a planar face of the frame member 121, sandwich brush holders 128 which hold brushes 130 in contact with the commutator 132 of the motor 126. The embodiment illustrated in FIG. 9 differs from that described previously in certain other respects as well. For example, the pair of insulating motor mounts, generally designated 134, serve to mount the motor 126 in the cut out 124. Preferably, the motor mounts 134 are formed in accordance with the teachings of my copending application, Ser. No. 37,810 filed May 15, 1970, entitled "Module Design - Double Insulated Field" and assigned to the same assignee as the instant application.

Figures 10, 12:
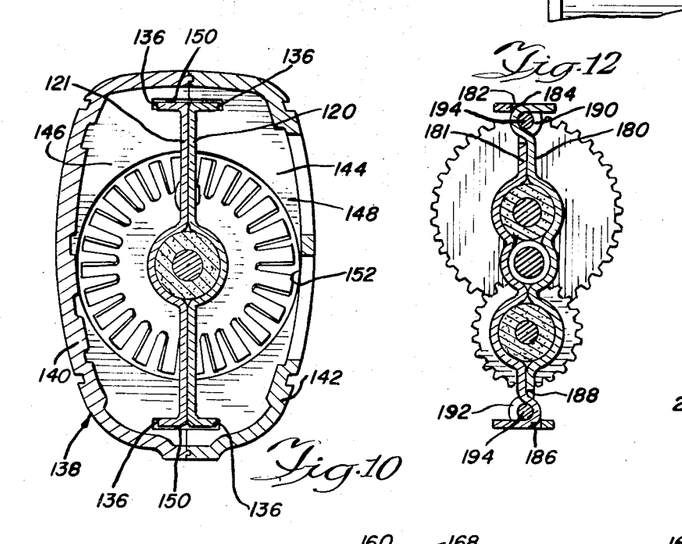
FIG. 10 is a vertical section taken approximately along the line 10—10 of FIG. 9.
FIG. 12 illustrates one alternate way of securing the frame plates together.
Figure 11:
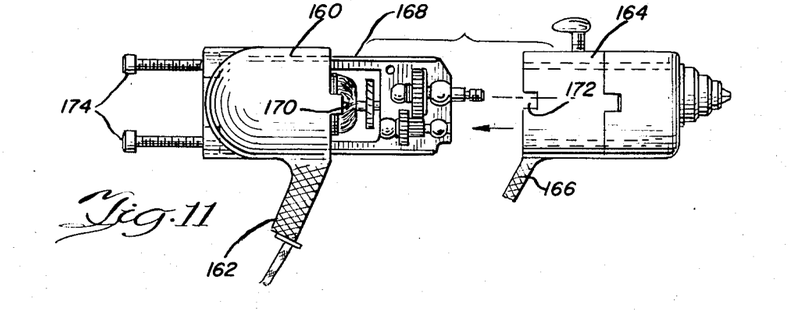
FIG. 11 is an exploded view illustrating a manner in which the frame assembly shown in FIG. 9 is received within the housing of a portable tool.

Furthermore, with reference to FIGS. 10 and 11, the embodiment shown in FIG. 9 includes outturned flanges 136 on both sides of each of the frame members. As best seen in FIG. 10, the flanges 136 are struck at 90° to the main body of the frame members 120 and 121 and serve to stiffen the same against bending. They therefore may be employed to replace the stiffening ribs 72 and 73 provided in the first described embodiment and have the advantage of providing greater rigidity with a simpler forming process.

The flanges 136 provide a still further advantage. As viewed in FIG. 10, a tool housing 138 formed of complementary halves 140 and 142 may include a crossweb 144 having a first half 146 and a second half 148 associated with the housing halves 140 and 142, respectively. When assembled in the manner illustrated in FIG. 10, the webs 146 and 148 define a pair of T-shaped openings 150 extending radially outwardly from a center aperture 152 to receive the outermost portions of the frame members 120 and 121 as well as the flanges 136 and thereby locate the assembled module within the housing 138. If desired, the webs 146 and 148 can be provided with locking elements in addition to the T-shaped openings 150 for securing the subframes comprising plates 120 and 121 in nonsliding movement within the housing.

FIG. 11 shows another embodiment whereby a housing may be formed to accommodate a subframe such as that shown in FIG. 9. As illustrated in FIG. 11, the tool housing is formed of a back half housing element 160 having a depending partial handle element 166 depending therefrom which is complementary with the partial handle 162. Webs not shown within the half housing elements 160 and 164 may be provided with T-shaped openings along the lines of those mentioned previously to receive a flanged subframe 168. Also, the rear housing element 160 may be provided with a tab 170 for receipt in an aligning notch 172 in the front half housing. Cap screws 174 may be used to secure the front housing element 164 to the rear housing element 160.

The invention also contemplates means other than rivets and can be used for securing the plates together. With reference to FIGS. 12-19, four alternate types of securing means are illustrated. With specific reference to FIG. 12, the two plates comprising the subframe are designated 180 and 181 and the plate 180 near its upper extremity includes a partial eye 182 which is adapted to be received in a cooperating cut out 184 in the plate 181. The lower extremity of the plate 182 has a similar partial eye 186 adapted to be received in a cooperating cut out 188 in the plate 180.

Spaced from the partial eye 182 along the length of the upper extremity of the plate 181 is a similar partial eye 190 which is received in a cut out notch shown in the upper extremity of the plate 180. By the same token, the lower extremity of the plate 180 includes a partial eye 192 received in a notch not shown in the lower extremity of the plate 181.

In actuality, each of the plates 180 and 181 may have a plurality of the partial eyes along each edge thereof spaced by the cut outs for receiving the partial eyes of the other one of the plates. To assemble the same, the plates 180 and 181 are located in contiguous relation with the partial eyes 182 on the upper extremity and the plate 180 being received in the cooperating cut outs 182 in the upper extremity of the plate 181, etc.

Rods 194 may then be threaded through the partial eyes to hold the plates 180 and 181 in the position illustrated. Alternately, screws such as the cap screws 174 (FIG. 11) could be used in lieu of the rods 194.

Figure 13:
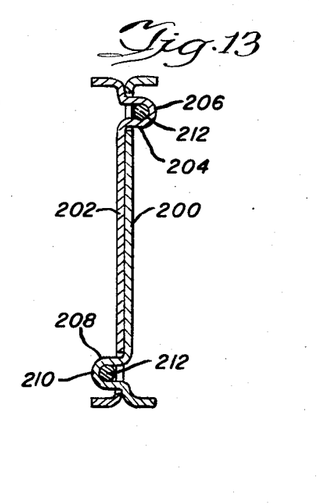
FIG. 13 illustrates another means by which plates may be secured together.

FIG. 13 shows another alternate means of securing the plates together which is somewhat similar to the means illustrated in FIG. 12. In the embodiment illustrated in FIG. 13, the plates are designated 200 and 202 with the upper extremity of the plate 200 having cut outs 204 receiving full eyes 206 on the upper extremity of the plate 202. The lower extremity of the plate 202 includes cut outs 208 which receive complementary full eyes 210 on the lower extremity of the plate 200. Again, once the plates are assembled in contiguous relationship, rods 212 are moved through the eyes 206 and 210 to hold the plates in assembled relation.

Figure 14:
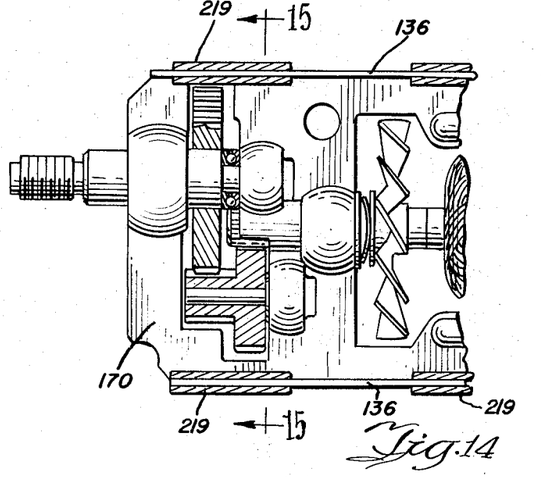
FIG. 14 is a partial side elevation illustrating still another way by which the plates may be secured together.
Figure 15:
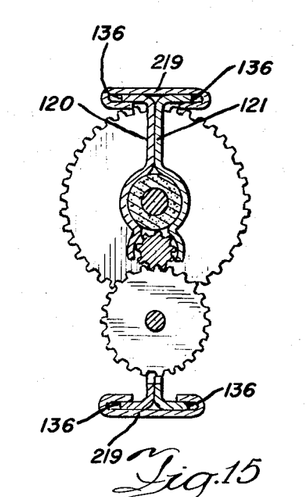
FIG. 15 is a vertical section taken approximately along the line 15—15 of FIG. 14.
Figure 16:
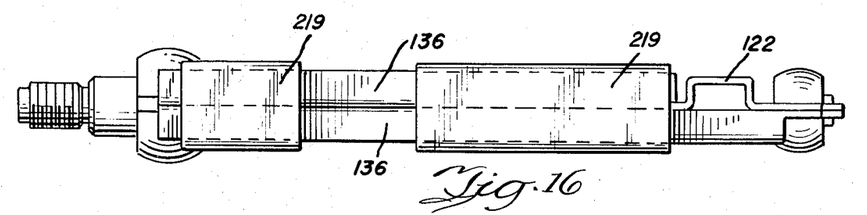
FIG. 16 is a partial plan view of the structure shown in FIG. 14.
Figures 17, 18, 19:
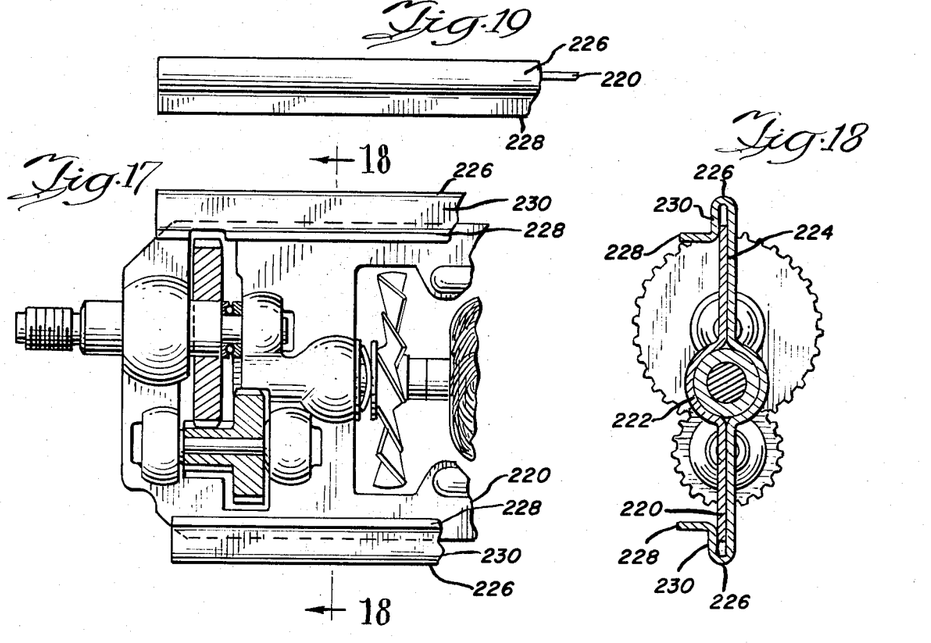
FIG. 17 illustrates still another means by which the plates comprising the frame may be secured together.
FIG. 18 is a vertical section taken approximately along the line 18—18 of FIG. 17.
FIG. 19 is a partial plan view of the assemblage of FIG. 17.

With reference to FIGS. 14-16, inclusive, another means by which plates such as the plates 120 and 121 may be secured is illustrated. In particular, one or more C-shaped clips 219, which may be of the same or different lengths, are fitted about the outwardly projecting flanges 136 at both sides of the plates 120 and 121. Still another form of securing means is illustrated in FIGS. 17-19, inclusive. As best seen in FIG. 18, one plate 220 comprising a portion of the subframe is substantially planar except for bearing recesses such as the one indicated at 222. That is, side flanges and/or stiffening ribs are not provided on the plate 220. The complementary plate 224 has a greater width than the plate 220 and has redirected ends 226 terminating in flanges 228. The redirected ends 226 define a U-shaped configuration with one leg of the U being formed by the main body of the plate 224 and the other leg being defined by a plate portion 230. The spacing between the portion 230 and the main body of the plate 224 is slightly less than the thickness of the plate 220 so that the plate 220 may be received between the legs of the U and firmly held in place. The outwardly extending ends 228 serve as stiffening flanges in the same manner as the flanges 136 mentioned previously in conjunction with the embodiment shown in FIG. 9.

Figure 20:
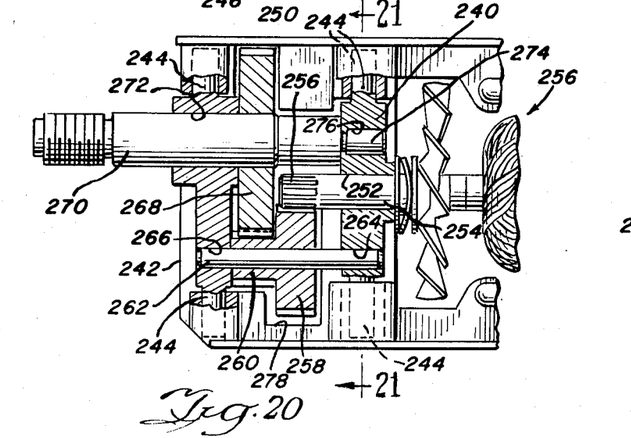
FIG. 20 shows an alternate method of mounting bearings in the assembly.
Figure 21:
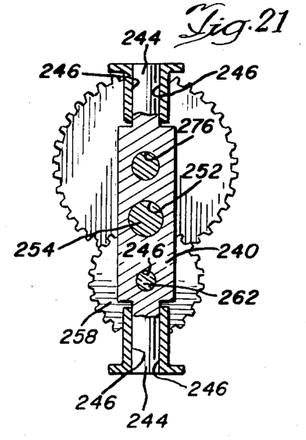
FIG. 21 is a vertical section taken approximately along the line 21—21 of FIG. 20.
Figure 22:
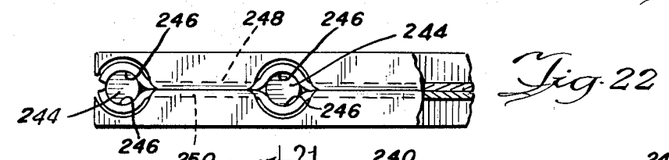
FIG. 22 is a partial plan view of assemblage shown in FIG. 17.

The invention also contemplates that motor and transmission bearings can be mounted within the subframe by means other than spherical bearings received in complementary spherical recesses. One alternate bearing mounting means is illustrated in FIGS. 20-22 inclusive and impose long elongated blocks 240 and 242 both of which terminate at their ends in cylindrical stub shafts 244. The stub shafts 244 are received in complementary semi-cylindrical recesses 246 in plates 248 and 250 which define the subframe.

With reference to the bearing block 240, the same includes a first bore 252 which receives the output shaft 254 of the motor 256 of the tool. As best seen in FIG. 20, the end of the output shaft 254 includes a gear formation 256 in mesh with an enlarged pinion gear 258. The pinion gear 258 is coupled with a smaller reduction gear 260 either mechanically or by being formed integrally therewith and the two are mounted for rotation on or with a shaft 262. One end of the shaft 262 is received within a bore 264 in the bearing block 240 while the other end is received in a bore 266 in the bearing block 242.

The smaller reduction gear 260 is in turn in mesh with enlarged drive gear 268 coupled to the output shaft 270 of the tool. One end of the output shaft 270 is journalled within a bore 272 in the bearing block 242 while the smaller reduced end 274 of the shaft 270 is received within the bore 276 in the bearing block 240. All of the gears just mentioned are located within complementary cut outs 278 in the plates 248 and 250 defining a transmission receiving opening.

It will be recognized that the use of such bearing blocks such as the bearing blocks 240 permit self-alignment in a direction parallel to the direction of elongation of the blocks 240 as well as about a pivotal axis defined by the subshafts 244 for smooth operation of the device as well as inexpensive fabrication of the same.

Figure 23:
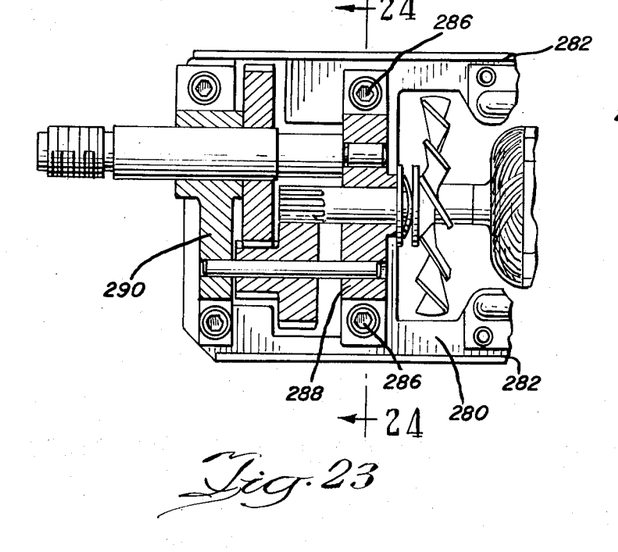
FIG. 23 illustrates another embodiment of the invention employing still another means of securing bearing mounts to the frame.
Figure 24:
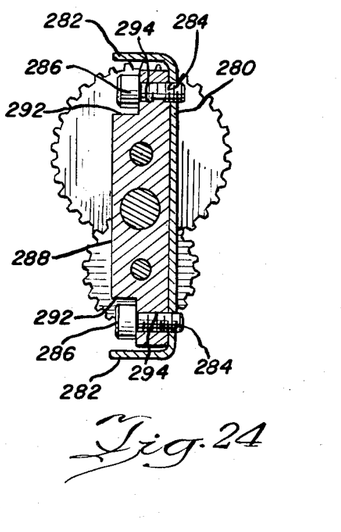
FIG. 24 is a vertical section taken approximately along the line 24—24 of FIG. 23.

Still another bearing mounting means is illustrated in FIGS. 23 and 24. In this embodiment, the subframe is formed of but a single plate 280 having stiffening flanges 282 at both sides thereof. Near the flanges 282, the plate 280 is provided with tapped bores 284 to receive cap screws 286 securing a bearing block 288 to the plate 280. As best seen in FIG. 23, a bearing block 290 is also employed and the bearing blocks 288 and 290 correspond approximately to the bearing blocks 240 and 242 mentioned previously in conjunction with the description of FIGS. 20-22; and the same cooperate together to mount substantially identical shafts and gearing.

To facilitate compactness, each of the bearing blocks 288, near its ends, includes a stepped portion 292 having a depth approximately equal to the depth of the head of the cap screws 286, as well as a bore 294 for receipt of the cap screws 286.

I claim:

1. A motor and transmission subframe adapted to be mounted in a main tool housing comprising: first and second plate-like frame members each having generally planar bodies formed of stampable sheet material and being substantial mirror images of one another, said planar bodies being in contiguous engagement; motor receiving means in each of said bodies for receiving a motor therein, said motor receiving means including generally complementary cut outs in said frame members; aligned stamped means in both of said frame members for receiving motor bearings, said stamped motor bearing receiving means comprising complementary struck out portions in the bodies of said frame members; means in both of said frame members for receiving a transmission for operative connection to said motor; stamped means in both of said frame members for receiving transmission bearings, said stamped transmission bearing receiving means comprising complementary struck out portions in said bodies; and means for rigidifying both of said frame members, said rigidifying means comprising elongated portions of each of said bodies extending outwardly from the plane of the respective body.

2. The subframe of claim 24 wherein at least some of said bearing receiving means are defined by complementary stamped, semi-spherically struck portions in said frame members defining spherical bearing receiving recesses between said frame members.

3. The subframe of claim 24 wherein at least some of said bearing receiving means comprise complementary stamped, semi-cylindrical struck portions in said frame members defining cylindrical bearing receiving recesses between said frame members.

4. The subframe according to claim 1 wherein said rigidifying means comprise outwardly extending flanges at the sides of said frame members; and further including means engaging adjacent flanges of said frame members for securing the frame members together.

5. The subframe of claim 1 wherein said frame members are stamped of sheet metal.

6. The subframe of claim 5 wherein said rigidifying means comprise stiffening ribs stamped in each of said frame members.

7. A sheet metal motor and transmission subframe as defined in claim 1, wherein said frame members are sheet metal and generally rectangular in configuration and together define a frame assembly, said frame assembly having parallel longitudinally extending side edges adapted to be received and mounted in a main housing.

8. A motor and transmission subframe adapted to be mounted in a main tool housing comprising: a first plate-like frame member, a second plate-like frame member, said first and second frame members being substantial mirror images of one another and having portions thereof in contiguous engagement, means in each of said frame members for receiving a motor therein, means in both of said frame members for receiving motor bearings, means in both of said frame members for receiving a transmission for operative connection to said motor; and means in both of said members for receiving transmission bearings, one of said frame members having a greater width than the other of said frame members with the sides thereof terminating in reverse portions returned about and gripping the sides of said other frame member; said frame members otherwise being mirror images of one another.

9. A motor and transmission frame adapted to be mounted in a main tool housing comprising: a first plate-like frame member, a second plate-like frame member, said first and second frame members being formed of stampable sheet material as substantial mirror images of one another and having portions thereof in contiguous engagement, stamped means on each of said frame members for receiving a motor therein, stamped means in both of said frame members receiving motor bearings, stamped means in both of said frame members for receiving a transmission for operative connection to said motor; stamped means in both of said members for receiving transmission bearings, said motor receiving means including stamped cut outs in both of said frame members, one of said members further including a pair of stamped struck out portions on opposite sides of said cut out and adapted to receive motor brush mounting means.

10. A subframe according to claim 9 wherein said frame members are mirror images of one another save for said pair of struck out portions.

11. A motor and transmission subframe adapted to be mounted in a main tool housing comprising: a first plate-like frame member, a second plate-like frame member, said first and second frame members being substantial mirror images of one another and having portions thereof in contiguous engagement, means in each of said frame members for receiving a motor therein, means in both of said frame members for receiving motor bearings, means in both of said frame members for receiving a transmission for operative connection to said motor, means in both of said members for receiving transmission bearings, and means for securing said frame members together, said securing means comprising struck eye portions in said frame members, said frame members further including cut outs for receiving the eye portions of the other frame member and securing rods extending through the eye portion of one frame member and in engagement with the other frame member adjacent the cut out thereof.

12. A motor and transmission subframe adapted to be mounted in a main tool housing comprising: a first plate-like frame member, a second plate-like frame member, said first and second frame members being substantial mirror images of one another and having portions thereof in contiguous engagement, means in each of said frame members for receiving a motor therein, means in both of said frame members for receiving motor bearings, means in both of said frame members for receiving a transmission for operative connection to said motor; and means in both of said members for receiving transmission bearings, the sides of said frame members terminating in outwardly extending flanges and further including means comprising a plurality of C-shaped clips associated with the adjacent flanges of said frame member for securing the frame members together.

13. A motor and transmission frame adapted to be mounted in a main tool housing comprising: a first plate-like frame member, a second plate-like frame member, said first and second frame members being formed of stampable sheet material as substantial mirror images of one another and having portions thereof in contiguous engagement, stamped means on each of said frame members for receiving a motor therein, stamped means in both of said frame members receiving motor bearings, stamped means in both of said frame members for receiving a transmission for operative connection to said motor; stamped means in both of said members for receiving transmission bearings, said frame members being formed of sheet metal and in contiguous engagement throughout a substantial portion of the periphery thereof, said motor receiving means including a first stamped cut out portion in said frame members, said first cut out portion encompassing a major area of said frame members, said motor bearing receiving means including aligned portions in said sheet metal member struck from the planar configuration of the frame members.

14. A motor and transmission frame adapted to be mounted in a main tool housing comprising: a first plate-like frame member, a second plate-like frame member, said first and second frame members being formed of stampable sheet material as substantial mirror images of one another and having portions thereof in contiguous engagement, stamped means on each of said frame members for receiving a motor therein, stamped means in both of said frame members receiving motor bearings, stamped means in both of said frame members for receiving a transmission for operative connection to said motor; stamped means in both of the said members for receiving transmission bearings, said frame members being formed of sheet metal and in contiguous engagement throughout a substantial portion of the periphery thereof, said transmission receiving means including a stamped cut out portion in said sheet metal frame members, said transmission bearing means including aligned portions in said sheet metal member struck from the planar configuration of the frame members.

15. A sheet metal motor and transmission module, comprising: a pair of stamped sheet metal plates, one of said plates being a substantial mirror image of said other plate, each of said plates having relatively larger and smaller cut out portions extending therethrough with the larger cut out portions being predominantly in one end portion of respective ones of said plates, said smaller cut out portions being completely in the other end portions of respective ones of said plates, two semi-spherically shaped portions struck outwardly from each plate and each pair of said semi-spherically shaped portions being positioned in alignment with each other in opposite edges of the larger cut out portion thereof, an electric motor positioned in said larger cut out portion having an output shaft, spherically shaped bearings on the output shaft nesting in said pair of aligned semi-spherically shaped portions adjacent said larger cut out, two gears drivingly connected to said output shaft of the motor and with each other, shafts supporting said gears, spherically shaped bearing means carried by said gear shafts, two semi-spherically shaped portions struck outwardly from each plate adjacent each end of each of said gear shafts adjacent the smaller cut out portion, said bearing means nesting in the semi-spherically shaped portions of the plates adjacent said smaller cut out portion, one of said gear shafts being an output for rotatably driving a member fastened thereto, brush mounting grooves in said mating plates adjacent said motor, brush holders and brushes nested in said grooves, and means for securing said sheet metal plates together for holding said motor and gear means assembled ready for incorporation in a motor driven instrument.

16. A motor and transmission subframe assembly to be mounted in a main tool housing, comprising: a first plate-like frame member of generally planar configuration, a second plate-like frame member of generally planar configuration, said first and second frame members being substantial mirror images of one another and having portions thereof in contiguous engagement, means for receiving a motor in said frame members, motor bearing receiving means in said frame members, transmission receiving means in said frame members, transmission bearing receiving means in said frame members, and flanges on each of said frame members and extending longitudinally along opposed sides of respective ones of said frame members to rigidify the same, each of said flanges being directed outwardly from its respective frame member and in a direction away from the other of the frame members.

17. A motor and transmission subframe assembly to be mounted in a main tool housing comprising: a first plate-like frame member of generally planar configuration, a second plate-like frame member of generally planar configuration, said first and second frame members being substantial mirror images of one another and having portions thereof in contiguous engagement, means for receiving a motor in said frame members, motor bearing receiving means in said frame members, transmission receiving means in said frame members, transmission bearing receiving means in said frame members, flanges extending longitudinally along the sides of said frame members to rigidify the same, said motor receiving means comprising complementary cut outs in said frame members defining an opening for receiving a motor, one of said frame members further including a pair of struck out portions confronting said opening and being located oppositely thereabout, said struck out portions in conjunction with the other frame member defining a pair of brush holder receiving spaces; said bearing receiving means comprising bearing receiving recesses defined by complementary aligned struck out portions in said frame members.

18. A tool employing the subframe of claim 17 and further including, a motor rotor received in said opening and having a commutator aligned with said brush holder receiving spaces, brush holders in said brush holder receiving spaces, brushes held by said brush holder and in electrical engagement with said commutator, bearings in said bearing receiving recesses, at least one of said bearings mounting said rotor for rotation within said subframe, transmission means mechanically connected to said rotor and mounted for rotation within said subframe by other bearings received in said recesses, and means defining a tool housing, said tool housing having T-shaped notches therein for receiving the flanges of said frame members.

19. A tool according to claim 18 and further including means securing said frame members together.

20. A tool according to claim 19 wherein said securing means comprise rivets extending between the frame members.

21. A tool according to claim 19 wherein said securing means comprise C-shaped clips located about adjacent ones of said flanges on said frame members.

* * * * *

Disclaimer 3,694,680.—*Anthony Jacyno*, Aurora, Ill. STAMPED SHELL SHEET METAL FRAME MODULE FOR A POWER TOOL. Patent dated Sept. 26, 1972. Disclaimer filed June 14, 1973, by the assignee, *McGraw-Edison Company*.

Hereby disclaims the portion of the term of the patent subsequent to Aug. 29, 1989.

[*Official Gazette February 5, 1974*]